US012646116B1

(12) United States Patent
Melkomian

(10) Patent No.: US 12,646,116 B1
(45) **Date of Patent: \*Jun. 2, 2026**

(54) AI AND SECURITY ENHANCEMENTS TO A SECURE, COMPLIANT ELECTRONIC TRADING PLATFORM USING THE OPEN OUTCRY METHODOLOGY

(71) Applicant: Raymond Michael Melkomian, New York, NY (US)

(72) Inventor: Raymond Michael Melkomian, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,933

(22) Filed: May 13, 2024

Related U.S. Application Data

(63) Continuation-in-part of application No. 15/441,036, filed on Feb. 23, 2017, now Pat. No. 12,014,418.

(60) Provisional application No. 62/302,082, filed on Mar. 1, 2016.

(51) Int. Cl.
*G06Q 40/04* (2012.01)
*G06F 3/01* (2006.01)
*G06F 3/16* (2006.01)

(52) U.S. Cl.
CPC ............. *G06Q 40/04* (2013.01); *G06F 3/012* (2013.01); *G06F 3/16* (2013.01)

(58) Field of Classification Search
None
See application file for complete search history.

(56) References Cited

U.S. PATENT DOCUMENTS

| | | | |
|---|---|---|---|
| 2002/0128952 A1* | 9/2002 | Melkomian ............ | G06Q 40/04 705/37 |
| 2002/0133449 A1* | 9/2002 | Segal ................... | G06T 11/206 705/37 |
| 2003/0126068 A1* | 7/2003 | Hauk ..................... | G06Q 30/08 705/37 |
| 2007/0295803 A1* | 12/2007 | Levine .................. | G06Q 20/10 235/379 |
| 2019/0355059 A1* | 11/2019 | Liberman ............. | H04L 9/0836 |
| 2020/0151817 A1* | 5/2020 | Mahfouz ................ | G06F 16/27 |
| 2021/0182300 A1* | 6/2021 | Assia .................... | G06Q 40/04 |

OTHER PUBLICATIONS

Delaney (IEEE Computer Graphics and Applications (vol. 19, Issue: 6, 1999, pp. 12-15).*

* cited by examiner

*Primary Examiner* — Gregory A Pollock
(74) *Attorney, Agent, or Firm* — Knowmad Law

(57) ABSTRACT
A secure, compliant trading platform for securities exchange using the open outcry methodology within a secure electronic exchange environment that reduces or eliminates unfairness and opportunities for fraud within the marketplace. Enhancements to the system include the addition of an exchange blockchain for recording all trade events, smart contracts that allow the use of digital currencies for monetary transactions associated with trades, and an intelligent exchange assistant that monitors the exchange member's activity and offers contextual notifications and makes recommendations in real-time to assist the exchange member. The system assures that private information is retained private and the blockchain records immutable data that is used for compliance checking and performance analytics.

4 Claims, 6 Drawing Sheets

AI AND SECURITY ENHANCEMENTS TO A SECURE, COMPLIANT ELECTRONIC TRADING PLATFORM USING THE OPEN OUTCRY METHODOLOGY

CROSS-REFERENCE TO RELATED DOCUMENTS

This patent application claims priority to U.S. Provisional Patent Application 62/302,082 and is a continuation-in-part to U.S. patent application Ser. No. 15/441,036 (hereafter referred to as the '036 application) which is hereby incorporated by reference as if fully set forth herein.

TECHNICAL FIELD

The present invention relates generally to the exchange structure, front and back office/firm/exchange operations, and the functions of brokers and their customers. The improvements in this application include the application of artificial intelligence to facilitate faster trading, notifications, and smart assistants. Blockchain technologies are used to assist with compliance and security.

BACKGROUND OF THE INVENTION

The parent invention, (the '036 application), disclosed a secure, compliant electronic trading exchange platform for commodities, futures, options, forwards, derivatives, swaps, and securities using the open outcry methodology.

The '036 application presents the motivation and use case that creates the requirement for an open outcry trading platform in view of the recent closures of the physical trading exchanges across the country. Open outcry inherently protects the market against certain forms of market manipulation and fraud and is therefore a desirable framework to maintain. However, because it is unlikely that physical trading exchanges will ever re-open, the disclosed virtual reality-based open outcry apparatus and methods or variants thereof as disclosed in the '036 application are needed.

The system uses a personal visual display to maintain privacy and security. There is also a public display for information that is meant to be available to all exchange members. Audio input and output is available for making and receiving bids. Customer orders are received by exchange members (users of the '036 invention). Those orders may have any number of limits, contingencies, etc. associated with them. The system validates the customer order and stores it in the database. An order sheet includes validated customer orders that are also present in the database.

The exchange member now virtually enters a selected trading pit using the previously described apparatus. That trading pit includes contracts in which the exchange member will trade. The exchange member makes a verbal outgoing bid according to open outcry methodology. The bid is received by the system and converted into a standard format and stored in the database for compliance checking. The outgoing bid is placed on the public display so that other exchange members (possibly not physically co-located) can see and hear it. When a bid is accepted, the trade is reported on the public display and to a clearing house (also for compliance checking).

Finally, because all aspects of the process, from the initial customer order to the placing of bids and acceptance of bids is logged and recorded in the database, a variety of compliance checks are disclosed and can be performed, most of which are not possible with the high frequency trade methods.

SUMMARY OF THE INVENTION

The present invention enhances the '036 application using recent artificial intelligence and data security innovations, especially large language models (LLMs) and blockchain.

First, because the present invention maintains the man-in-the-loop via the open outcry methodology, all data associated with an order and execution of that order is captured. This allows for a number of AI assisted techniques for the exchange member not possible in a non-open outcry framework. These include automatically monitoring the market for predetermined market conditions, executing multiple trades simultaneously, the ability to "be" in more than one pit at a time (not possible in physical pits, but certainly possible in VR). The AI assistant can also learn trading patterns of its user to offer assistance or notifications when certain events are triggered that have special meaning to the user. The AI could also be used to make markets on both the bid and ask side, freeing the exchange member to focus on other tasks that cannot be automated.

Second, the present invention discloses the use of blockchain as a means for securely recording trades. Every offer, whether new, joined, or replacement of a previous offer is recorded in a block that includes all the relevant data about the bid. When a trade is executed, that too is recorded in a block ensuring permanence of the record for compliance and subsequent analytics.

Furthermore, smart contracts can also be embedded in a block such that digital currency can be automatically used to complete a trade. The smart contract can also be included in the blockchain and when executed, the transfer of digital currency inherently creates another block to ensure that payment was made.

DESCRIPTION OF THE INVENTION

Figure 1:
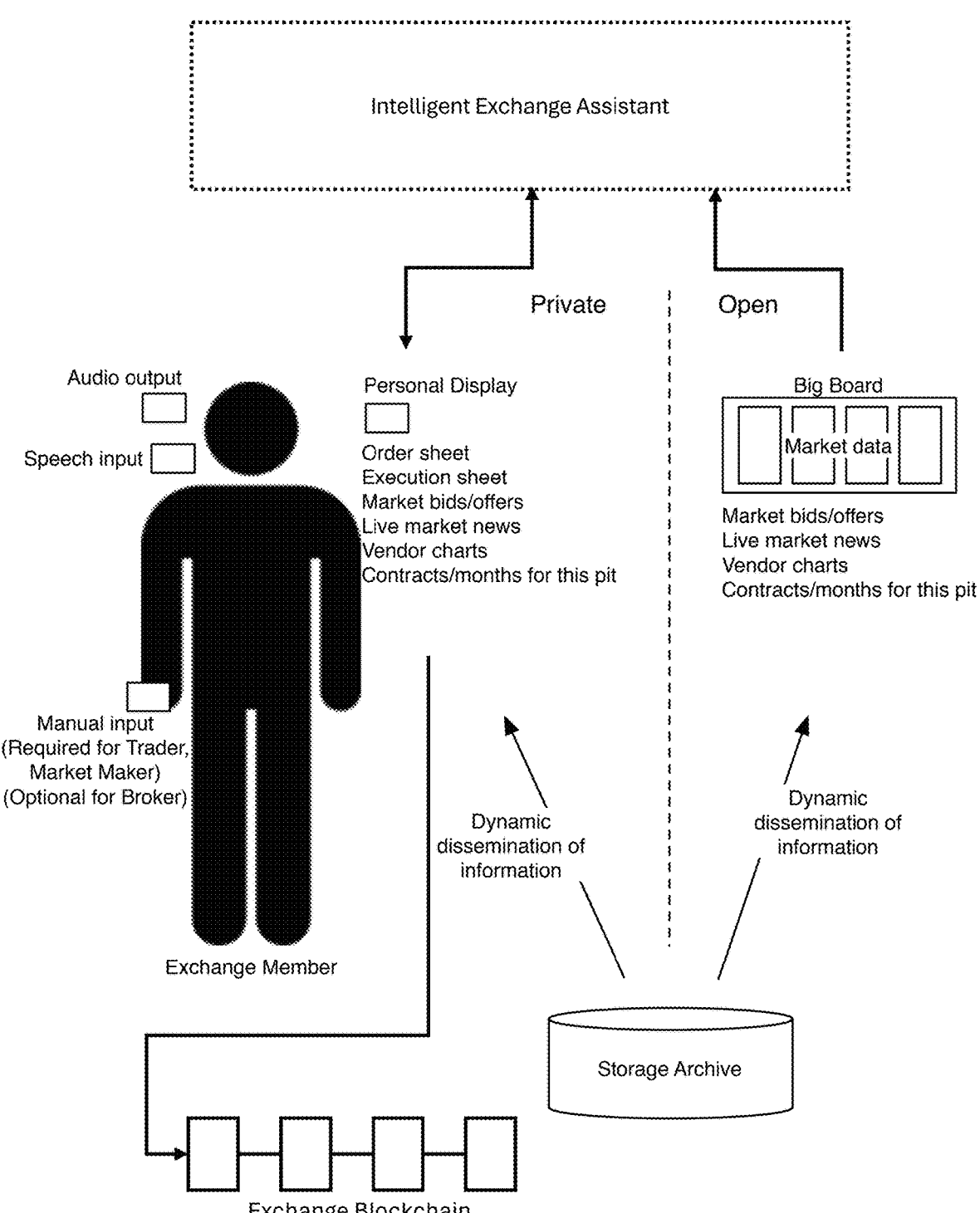
FIG. 1 shows the data present in the private and the open displays that are also used in the Intelligent Exchange Assistant, as well as the reporting of events to the exchange blockchain.

The improvements described herein all make use of the previously disclosed apparatus described in the '036 application. Specifically, data flows, both public and private through the exchange member interface are captured and used with a learning module to assist the exchange member in optimizing decisions while conducting trades in a pit. Furthermore, all trade-related activity, (e.g. bids, offers, orders) are captured by the system and preserved in blocks in a blockchain using conventional blockchain processes to preserve the data and to allow for far superior compliance and performance analytics to be conducted.

Using Blockchain to Record Trades in the Open Outcry Exchange

Using blockchain to record trades in an open outcry commodity exchange enhances transparency, security, and efficiency in the trading process. The key features are:

(1) Trade Representation: Each trade in the open outcry exchange is represented as a digital transaction on the blockchain. This transaction includes details such as the commodity traded, quantity, price, time, and the identities of the buyers and sellers involved. Optionally, the system can also represent all trade-related activity in blocks as well, even if the data within the block may be private because only the holder of the private key will be able to view the contents of the block. This allows for the encoding of bids, offers and customer orders, all of which are useful in compliance checking and analytics.

(2) Decentralized Ledger: The blockchain serves as a decentralized ledger, meaning that the record of trades is distributed across multiple nodes (computers) in the network. This ensures that there is no single point of failure and enhances the security of the transaction records.

(3) Smart Contracts: Smart contracts, which are self-executing contracts with the terms of the agreement directly written into code, are utilized to automate the execution of trades once certain conditions are met. When a buyer and seller agree on a trade in the open outcry pit, a smart contract automatically executes the trade on the blockchain once both parties confirm their agreement. This can include payment via digital currencies (see below).

(4) Immutable Record: Once a trade is recorded on the blockchain, it becomes immutable, meaning that it cannot be altered or tampered with. This provides a high level of transparency and trust in the integrity of the trade records which is critical for compliance checking and reporting.

(5) Real-Time Settlement: Blockchain technology enables real-time settlement of trades, eliminating the need for intermediaries and reducing settlement times from days to minutes or even seconds. This can significantly reduce counterparty risk and improve liquidity in the market. This is also related to the use of digital currencies (see below).

(6) Accessibility: The use of blockchain technology makes trade data more accessible to authorized parties such as regulators, auditors, and market participants. This can facilitate regulatory compliance and market surveillance efforts. It also is able to retain privacy when the presence of a transaction (for example), must be known but the details of the bids and offers that led to that transaction may be private or semi-private.

(7) Privacy and Confidentiality: While blockchain provides transparency, it also allows for privacy and confidentiality through techniques such as encryption and permissioned access. This ensures that sensitive trade information is only accessible to authorized parties.

Overall, leveraging blockchain technology in an open outcry commodity exchange revolutionizes the trading process by making it more transparent, secure, and efficient, while also reducing costs and risks associated with traditional trading systems.

To implement blockchain for recording trades, the following steps are required.

Choose A Blockchain Platform: Select a suitable blockchain platform based on factors such as scalability, consensus mechanism, security, and development flexibility. Popular options include Ethereum, Hyperledger Fabric, and Corda, each offering different features and capabilities. The present invention is agnostic as to which platform is chosen.

Design the Data Structure: Define the data structure for recording trade transactions on the blockchain. This includes determining the information to be included in each transaction, such as trade details (commodity, quantity, price), timestamps, participant identities, and any additional metadata.

Develop Smart Contracts: Write smart contracts to automate the execution of trades and enforce the rules of the exchange. Smart contracts can facilitate trade settlement, verify trade authenticity, and handle any necessary escrow or payment mechanisms. Ensure that smart contracts are securely coded and thoroughly tested to prevent vulnerabilities and exploits.

Deploy Nodes: Set up a network of blockchain nodes to host the distributed ledger. Nodes can be run by the exchange operator, market participants, or other trusted entities. Determine the consensus mechanism (e.g., proof of work, proof of stake) and configure node permissions and access control settings.

Record Transactions: Record trade transactions as transactions on the blockchain. Each trade should be represented as a digital transaction containing relevant details, such as the commodity traded, quantity, price, timestamp, and participant identities. Ensure that transactions are cryptographically signed by the involved parties to verify authenticity and prevent tampering.

Consensus and Validation: Validate and reach consensus on new transactions added to the blockchain. Depending on the chosen consensus mechanism, this may involve miners (in proof of work systems), validators (in proof of stake systems), or other network participants. Consensus mechanisms ensure the integrity and immutability of the blockchain ledger.

Ensure Security and Privacy: Implement security measures to protect the blockchain network from cyberattacks, unauthorized access, and data breaches. Utilize encryption, access controls, multi-factor authentication, and other security best practices to safeguard sensitive trade data. Consider privacy-enhancing techniques such as zero-knowledge proofs or private transactions to protect participant identities and trade confidentiality.

Implement Governance and Compliance: Establish governance policies and compliance measures to ensure that the blockchain-based trading system adheres to relevant regulatory requirements and industry standards. This may include KYC/AML procedures, reporting obligations, audit trails, and regulatory oversight mechanisms.

Integration with Existing Systems: Integrate the blockchain-based trading platform with existing exchange infrastructure, trading systems, market data feeds, and other relevant applications. Ensure seamless interoperability and data exchange between the blockchain network and external systems to facilitate trade execution, settlement, and reporting processes.

Monitor and Maintain: Continuously monitor the performance, reliability, and security of the blockchain-based trading system. Implement monitoring tools, alerts, and analytics to detect and mitigate potential issues or anomalies. Regularly update and maintain the blockchain network with software upgrades, patches, and improvements to enhance functionality and security over time.

Turning to the figures, FIG. 1 shows how the data available to the exchange member (that include both the private and the open side of the figure) can contain data that is transmitted and added to the blockchain data structure. In this non-limiting example, the exchange member (referred to as the user) has access to an order sheet, execution sheet, market bids and offers, and contracts for a specific pit or pits. In particular, the trade-related data can be encoded into a block for compliance checking. For example, a customer transmits an order to his broker. That order is validated and then appears on an order sheet. Subsequent bids and offers result in a trade. All of the above including time stamps for each event can be encoded in the blockchain either independently, or encapsulated in a single block.

As described in the '036 parent application, compliance and security problems such as bucketing (see [0040]), churning (see [0042]), front running (see [0044]), circular trading or wash sales (see [0050]), cross trades (se [0052]), interpositioning (see [0054]), and trading ahead (see [0056]) can all be addressed using this data now preserved in the blockchain.

Figure 3:
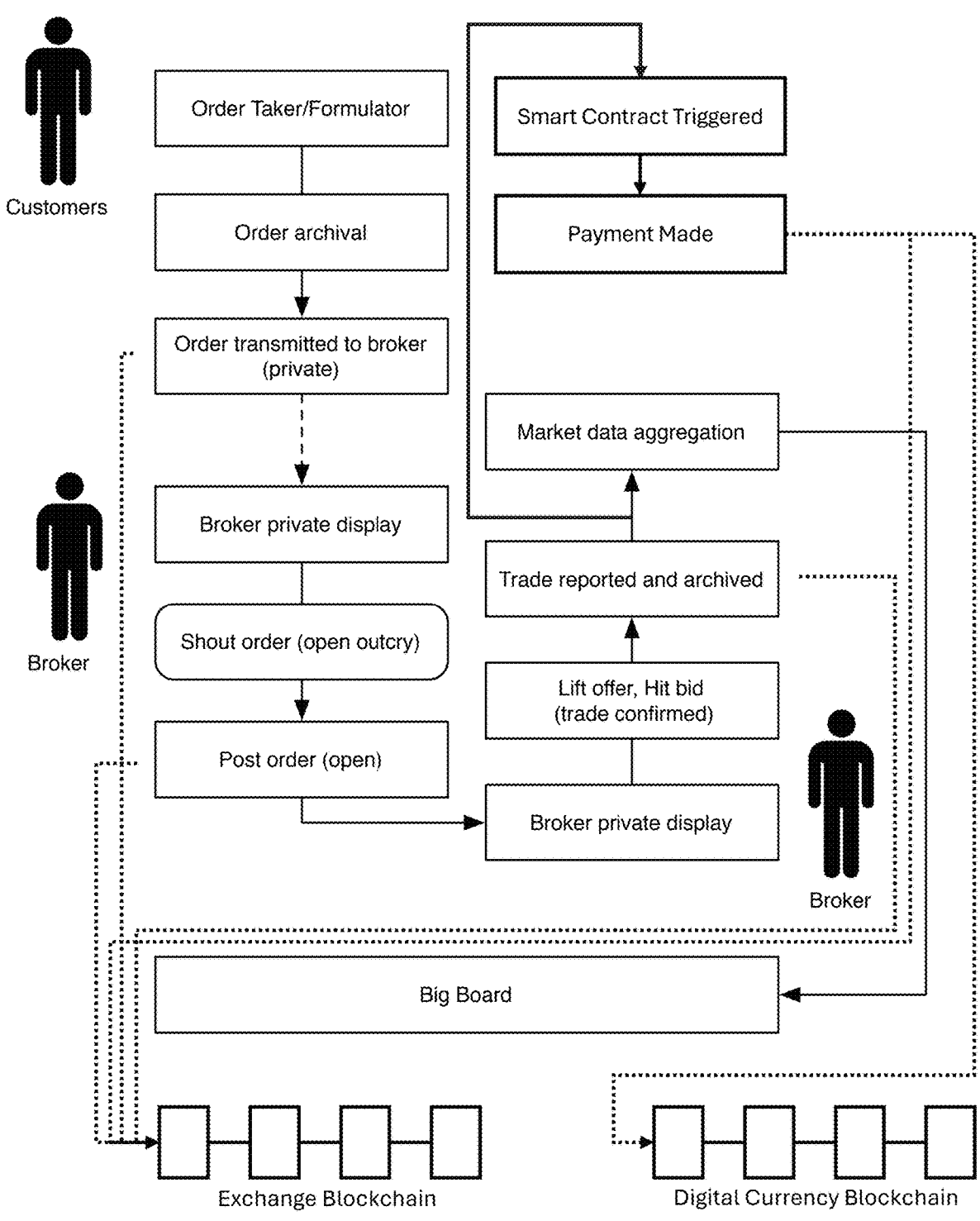
FIG. 3 illustrates the process flow from the customer to the exchange member (broker) to a second exchange member (broker) highlighting how events are stored in the exchange blockchain and payments are managed via smart contracts and a digital currency blockchain.

FIG. 3 shows a detailed flow diagram from the customer, to the broker, to a second broker pointing out each step where specific data can be captured and added to a block. This figure also shows payment details (see below).

Figure 6:
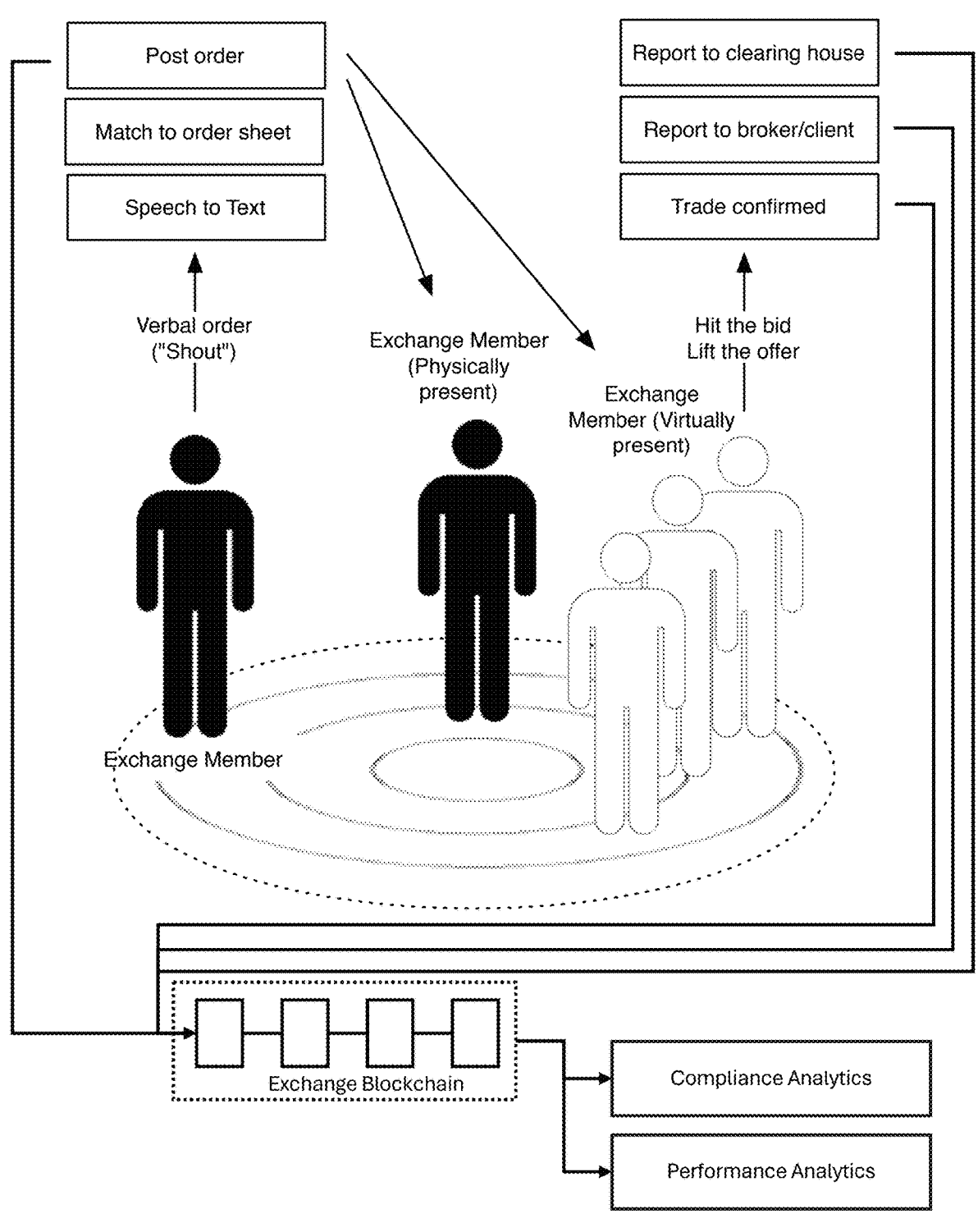
FIG. 6 shows that data during exchange activity is recoded in the exchange blockchain which can then be used for compliance analytic, performance analytics or any other form of analytics.

FIG. 6 shows a more representative view where the posted order is sent to the exchange member and is recorded on the blockchain. Bids and offers are also reported and recorded similarly as when the trade is confirmed. Lastly, when the trade is reported to the client and to the clearing house can also be recorded. All of these events with time stamps are important for compliance and performance analytics that can be run in real time or at some set frequency.

Use of Digital Currencies in the Open Outcry Exchange

Integrating digital currencies such as Bitcoin into an open outcry commodity exchange can introduce several benefits and opportunities:

Facilitating Transactions: Bitcoin or other digital currencies can be used as a medium of exchange for settling trades on the commodity exchange. Traders can use Bitcoin to quickly and securely transfer value for commodities bought or sold during open outcry sessions. As a trade is completed and validated, a smart contract can execute triggering the transfer of ownership of the correct digital currency value from buyer to seller.

Reducing Transaction Costs: Compared to traditional payment methods such as bank transfers or credit cards, using Bitcoin for transactions can potentially reduce transaction costs, especially for international trades. This is particularly beneficial for traders dealing with commodities across different regions. Recall that the present invention allows for distributed trading pits anywhere there is a secure exchange facility as described in the '036 application.

Improving Settlement Speed: Bitcoin transactions typically settle much faster compared to traditional banking systems, which can take days for settlement. Utilizing Bitcoin can enable near-instantaneous settlement of trades, reducing counterparty risk and improving liquidity in the market.

Enhancing Accessibility: Digital currencies like Bitcoin are accessible globally, enabling traders from different parts of the world to participate in the commodity exchange without the need for currency conversions or dealing with multiple fiat currencies.

Promoting Transparency: The transparent nature of blockchain technology underlying Bitcoin can enhance transparency in the trading process. All Bitcoin transactions are recorded on the public blockchain, providing an immutable and auditable record of trade activity.

Mitigating Currency Risks: By using Bitcoin as a universal medium of exchange, traders can mitigate currency risks associated with trading in multiple fiat currencies. This can be particularly advantageous in volatile currency markets.

Innovative Financial Products: Integrating Bitcoin opens up possibilities for creating innovative financial products tied to commodity trading, such as Bitcoin-denominated futures contracts or options. This can attract new types of investors and diversify the market.

Regulatory Considerations: It is important to note that integrating Bitcoin into a commodity exchange requires careful consideration of regulatory compliance, as digital currencies are subject to varying regulations in different jurisdictions. Compliance measures would need to be implemented to ensure adherence to anti-money laundering (AML) and know your customer (KYC) regulations.

Overall, incorporating digital currencies like Bitcoin into an open outcry commodity exchange brings efficiency, accessibility, and innovation to the trading process, but it requires careful planning, infrastructure development, and regulatory compliance measures.

Merging these last two ideas, as bids and offers are recorded in blocks on the blockchain, once a trade is complete (bid and offer are matched to the same price), not only will the system create a new block to record the transaction as described above, but the smart contract can specify digital currency that transfers ownership according to the rules in the smart contract. This digital currency is not unique to the exchange and therefore all digital currency can be bought and sold in a decentralized marketplace.

FIG. 3 shows where in the process, as the trade is completed, reported and archived, the smart contract is triggered resulting in a payment being made which in turn adds one or more blocks onto the digital currency blockchain. Note the digital currency blockchain is not unique to the present invention. It uses the same blockchains used by any other digital currency transaction, but is integrated into the present invention vis the smart contract triggered by a valid trade. The trade and trade data itself (see above) is recorded in a blockchain unique to the exchange or the pit.

The Intelligent Exchange Assistant

Turning now to the intelligent exchange assistant, the same data discussed above that is provided to the exchange member either privately or on the open big board can all be used as input to a learning module using conventional machine learning techniques resulting in a real-time assistant to the exchange member to optimize trading performance and to ensure that best practices are followed that meet all compliance standards.

Figure 2:
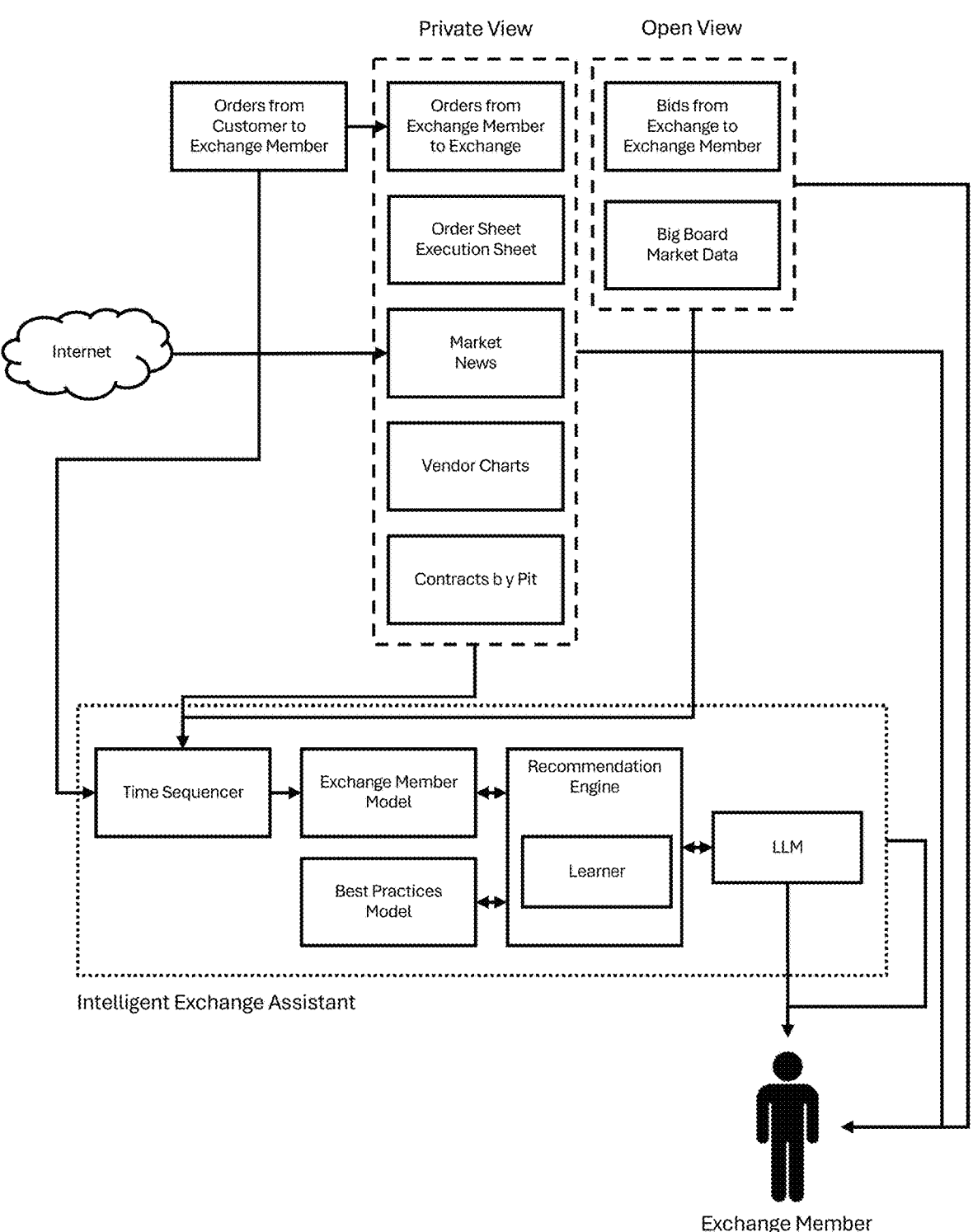
FIG. 2 is a flow chart showing how each item of information present in FIG. 1 in the private and/or open views are fed into a time sequencer and then into the recommendation engine that has a learner that updates and refines the exchange member model and the best practices model.
Figure 4:
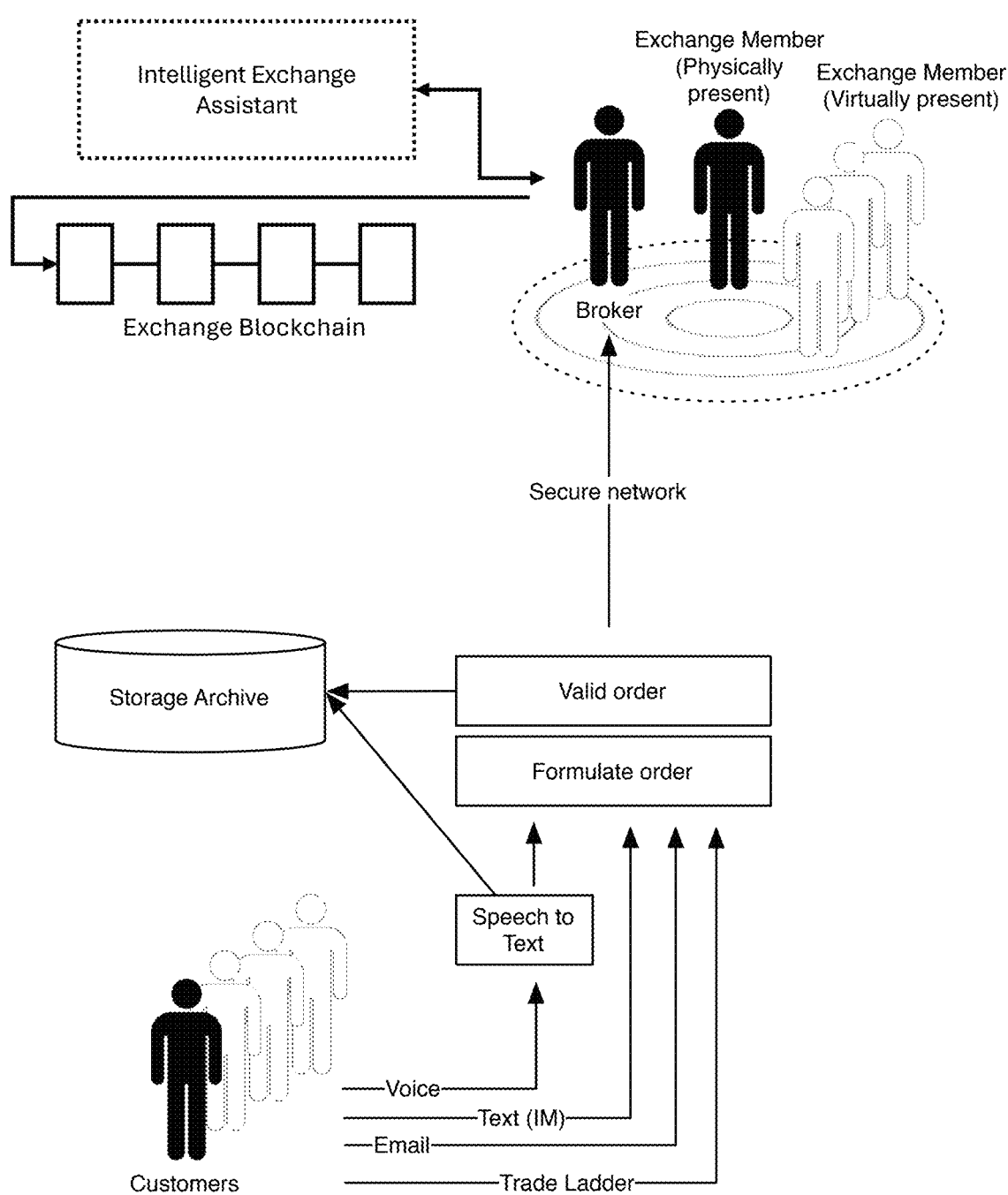
FIG. 4 shows that as orders are validated, they are passed to the exchange member where events are recorded in the blockchain and the intelligent exchange assistant aids the exchange member in real time during a trading session.
Figure 5:
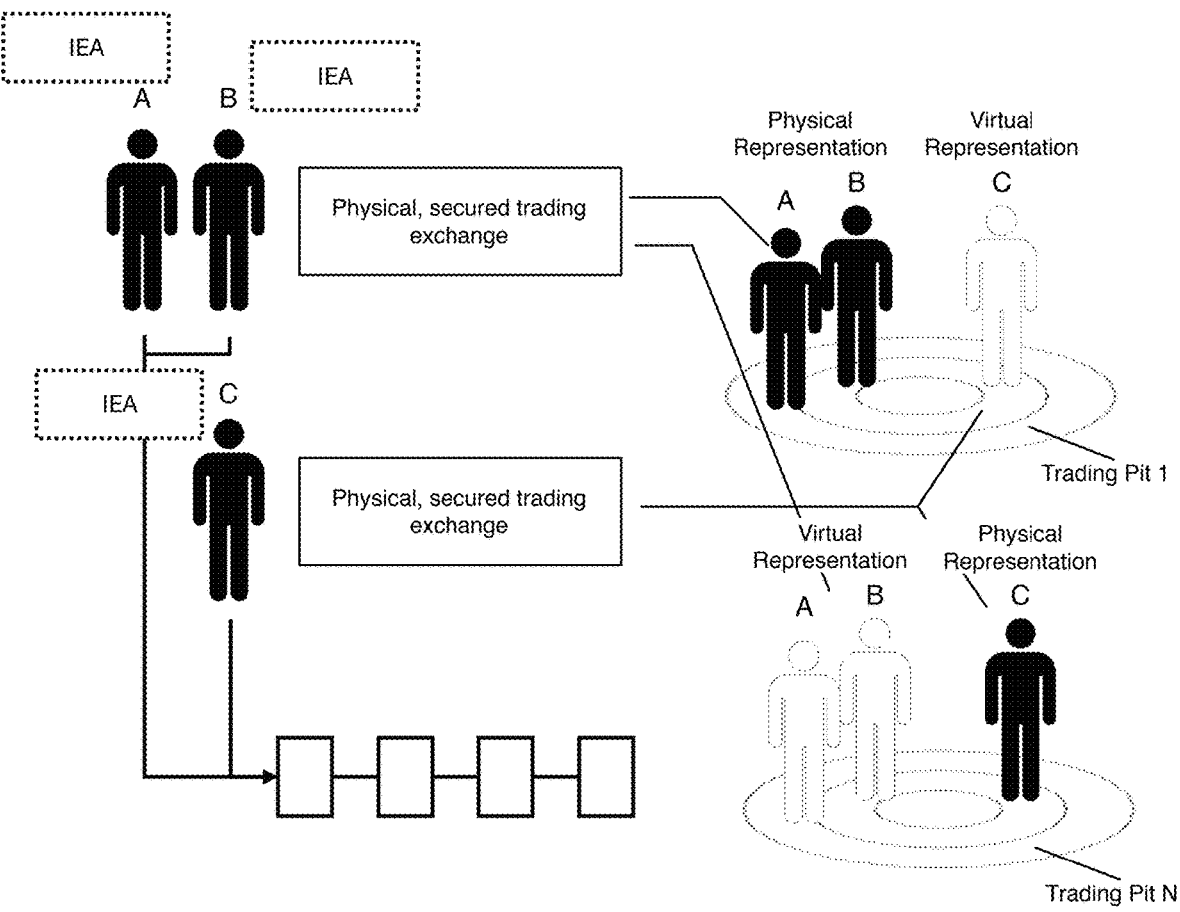
FIG. 5 shows how each exchange member whether collocated or not has access to a private intelligent exchange assistant as well as the shared exchange blockchain.

FIG. 2 shows a detailed schematic diagram of the intelligent exchange assistant. Orders from customers enter the system as shown in FIG. 4 (voice, text, email, trade ladder, etc.). Those orders are validated, stored in the blockchain as described above, and are then transmitted to the exchange member's private display on an order sheet. The order sheet, the execution sheet, bids, offers, and contracts by pit are all data that is input to the intelligent exchange assistant. Market news and other relevant open source data is obtained from an internet connection. All data in the open vide (big board, etc.) is also valid input to the intelligent exchange assistant.

Time sensitive items such as bids and offers must be time stamped and sequenced. The recommendation engine within the intelligent exchange assistant contains a learner that can be any conventional machine learning process. The learner may use reinforced learning and may be supervised, unsupervised, or some combination of both modes. A large language model (LLM) is connected to the recommendation engine as it provides general natural language capabilities (both on the input and output) as well as context for the learner. The system can either use a general purpose LLM such as ChatGPT, Claude, or similar, or for improved performance, can used a specialized LLM trained on the same data being used by the learner itself.

The recommendation engine initially contains a general best practices model that includes exchange rules, regulations, guidelines, and best practices that can be used to guide the exchange member's actions (or recommendations to those actions). Further, the recommendation engine constructs a model of the exchange member him/her self to capture preferences, tendencies, weaknesses, and strengths. These can be used by the recommendation engine to better formulate future recommendations that improve performance, compliance, and general learning on the part of the exchange member.

The interface to the exchange member includes visual displays generated by the intelligent exchange assistant as well as natural language output generated by the LLM. Conversely, the exchange member can interact with the intelligent exchange assistant via a visual interface as described in the '036 application or via spoken natural language processed by the LLM.

Assistance provided by the intelligence exchange assistant includes automatically monitoring the market for predetermined market conditions and alerting the exchange member accordingly, executing multiple trades simultaneously, the ability to "be" in more than one pit at a time (not possible in physical pits, but certainly possible in VR). The AI assistant also learns trading patterns of its user to offer assistance or notifications when certain events are triggered that have special meaning to the user. The user is advised when and how to use certain resources or techniques to achieve a desired end state, such as the use of options. The AI is also be used to make markets on both the bid and ask side, freeing the exchange member to focus on other tasks that cannot be automated.

INDUSTRIAL APPLICATION

The present invention pertains to the operation and management of any type of exchange, e.g. commodities contracts, futures, stocks, or any security.

What is claimed is:

1. A system for an intelligent exchange assistant in a virtual securities trading exchange using an open outcry method, the system comprising:
   a trade event having an order type, a customer order, and trade information including a time code indicating when the trade event occurred;

a storage database for securely storing trade events;
a customer interface coupled to the storage database, said customer interface having a processor and computer readable storage medium containing software instructions to
   receive a customer order from a customer via voice or text, said customer order having an order type, order information, and optional contingencies,
   convert the customer order into a standard format,
   validate the customer order to verify that the customer order is complete and valid, and
   store the formatted and validated customer order in the storage database and onto an order sheet associated with an exchange member for the customer;
an exchange member interface coupled to the storage database having
   a personal display having an eye-worn device and a head-tracker, viewable only to the exchange member that cannot be viewed by other exchange members;
   a public display that is not private to any specific exchange member and is viewable by all exchange members:
   audio inputs and outputs for making and receiving bids based on the customer order; and
   a processor and computer readable storage medium containing software instructions to
      select a trading pit and associated contract months in which the exchange member will trade,
      present the order sheet on the personal display:
      present public data associated with the trading pit on the public display,
      receive a verbal customer order from the exchange member as an outgoing bid,
      convert the outgoing bid into a standard text format,
      match the outgoing bid against the order sheet to determine if the outgoing bid is a new outgoing bid on a new customer order or an existing outgoing bid on an existing customer order,
      post the outgoing bid in the public display for other exchange members to see and hear,
      accept an incoming bid resulting in a completed trade event,
      store the completed trade event to the storage database, and
      report the completed trade event to the public display, to the customer, and to a clearing house;
a time sequencer coupled to the exchange member interface, wherein the time sequencer receives exchange and trade data from the exchange member interface and adds a time stamp to each data;
a recommendation engine coupled to the time sequencer, wherein the recommendation engine includes a learner;
a Large Language Model (LLM) coupled to the recommendation engine and to the exchange member interface, wherein the exchange member interface delivers relevant notifications and recommendations to the exchange member and
a compliance checker and reporter having a processor and computer readable storage medium containing software instructions to
   analyze completed trade events in the storage database,
   identify and report instances of bucketing, churning, front running, flash trading, high frequency trading, circular trading, cross trading, interpositioning, trading ahead, cornering the market, and pre-arranged trading, and confirm compliance of completed trade events to the exchange when the compliance checker and reporter verifies compliance of said completed trade event.

2. The system of claim 1 further including a best practices model coupled to the recommendation engine.

3. The system of claim 1 further including smart contracts associated with each validated trade, wherein after the trade is validated, said validated trade triggers its associated smart contract that transfers ownership of digital currency from the buyer to the seller.

4. The system of claim 1 wherein the storage database is implemented as a blockchain.

\* \* \* \* \*